UNITED STATES PATENT OFFICE.

JOSIAH MASON, OF ERDINGTON, NEAR BIRMINGHAM, AND ALEXANDER PARKES, OF GRAVELLY HILL, NEAR BIRMINGHAM, ENGLAND.

IMPROVEMENT IN PROCESSES OF TREATING ORES AND ALLOYS OF NICKEL.

Specification forming part of Letters Patent No. 180,142, dated July 25, 1876; application filed June 5, 1876.

*To all whom it may concern:*

Be it known that we, Sir JOSIAH MASON, of Erdington, near Birmingham, England, knight, and ALEXANDER PARKES, of Gravelly Hill, near Birmingham, aforesaid, metallurgist, have invented new and useful Improvements in Treating Ores and Alloys of Nickel, which improvements are fully set forth in the following specification.

Our said invention has for its object to treat ores of nickel for the purpose of obtaining nickel or alloys of nickel therefrom, and to treat alloys of nickel so as either to obtain metallic nickel therefrom, or to purify the alloys from objectionable impurities.

That part of our invention which refers to the treatment of ores of nickel is especially applicable to the obtaining of nickel and alloys of nickel from carbonate and other oxidized ores of nickel—such, for example, as the ores obtained from New Caledonia; but our invention is also applicable to other ores of nickel.

In treating ores of nickel we fuse the ore together with oxide of copper or lead and carbon, together with a flux, in a reverberatory or other furnace; or in vessels heated in furnaces. The furnaces employed may burn gaseous or solid fuel.

In place of oxide of copper or lead, granulated metallic copper—such as the natural granulated copper called "coro coro," or artificially granulated or precipitated copper—may be used. The flux may consist of fluor-spar or fluor-spar and oxide of iron, or fluor-spar, oxide of iron, and China clay; or cryolite or carbonate of baryta, or sulphate of baryta, or sulphate of lime, or chloride of lead, or the chlorides of barium, sodium, calcium, or zinc, may employed as fluxes.

By this treatment of the nickel ore we obtain an alloy consisting, essentially, of nickel and copper. If the crude alloy thus obtained contains iron in an injurious quantity, we treat it by fusing it with a further quantity of oxide of copper, by which treatment the greater part of the iron will be removed. In order to remove the last traces of iron, when this is necessary, we treat the nickeliferous alloy with chlorine or chloride of lead, or other substance capable of yielding chlorine, by which treatment the iron is eliminated.

In order to separate iron in the making of the alloy, we sometimes prefer to fuse the ground ore with chloride of sodium and chloride of calcium into a pasty mass, at a comparatively low temperature. By this means we separate much of the iron, as in afterward treating the pulverized semi-fluid mass with water, agitating it while running it off, a large quantity of oxide of iron is separated and carried off mechanically. The nickel residuum is afterward fused with oxide of copper, precipitated or granulated metallic copper, or, when it can be readily obtained, native copper, in a finely-divided state, known in commerce as "coro coro," together with carbon and fluxes; or the nickel residuum may be dissolved out, and the oxide of nickel recovered, and reduced therefrom in the usual way of separating nickel from other metals by the wet process. The alloy of nickel and copper obtained in the manner described may, if sufficiently pure, be used for the manufacture of the alloy called "German silver."

In refining nickel alloyed with copper and other metallic impurities, we employ atmospheric air or oxygen, hydrogen, chlorine, or a mixture of oxygen and hydrogen, directed upon the surface of the melted alloy, or passed through the melted alloy; or chloride of lead, or of zinc, or of copper, or of iron may be used for the same purpose; or we reduce the nickel from its oxidized ores by means of sulphur or sulphate of lime or baryta, together with carbon and fluxes; or we convert the nickel in the ore into a sulphuret of nickel by fusing the ore with sulphuret of nickel, or iron, or copper, or lead; or the ore may be converted into an arsenical compound by fusion with arsenical pyrites, those kinds being preferred which contain nickel; or other compounds containing arsenic may be employed with like effect.

Another part of our invention consists in calcining sulphurets or arseniurets of nickel, whether obtained from New Caledonian or oxidized ores, or obtained from any other source, to free them from sulphur or arsenic, as the case may be, and afterward recalcining them with chloride of sodium alone, or with other matters, in order to convert the nickel into a soluble chloride, which may afterward be dissolved out therefrom by water, or water saturated with chlorine, and the nickel from such solution may be recovered or precipitated in the usual way, or reduced therefrom by means of electric or magnetic currents; or we calcine the sulphuret compounds of nickel in such a manner as to form a sulphate of nickel; or the sulphuret may be calcined and fused with bisulphate of potash, or other substance capable of yielding sulphuric acid during the operation; but, by whatever method obtained, the sulphate is taken up in water or chlorine-water, and the nickel separated by the usual methods, or thrown down in a metallic state by electric or magnetic currents.

In smelting or treating nickel ores containing a low percentage of the metal we employ a blast-furnace in place of a reverberatory or other furnace not urged by a blast. This part of our invention is especially applicable to the treatment of the poorer kinds of oxidized nickel ores, such as are now being obtained in New Caledonia, and other localities.

By the use of a blast-furnace we are enabled to concentrate the nickle in the shape of a speiss, containing the nickel combined with other metals, such as copper; and this we propose to do as near to the mines as may be convenient, where labor, and fuel, and fluxes, and other necessary materials are to be readily obtained in the neighborhood of the mines.

Our invention may be worked with much greater advantage and economy in the neighborhood of the mine, and a great saving will thereby be effected in the cost of freight or carriage.

Having now described the nature of our invention, and the manner in which the same is to be performed, we wish it to be understood that we do not limit ourselves to the precise details herein described, as the same may be varied without departing from the nature of our invention; but

We claim as our invention—

1. The process of obtaining alloys of nickel and copper from oxidized ores of nickel by heating said ores with oxide of copper, carbon, and fluxes, and purifying, when necessary, said alloys by a second fusion with oxide of copper, carbon, and fluxes, and also further treating the nickeliferous alloy, when necessary, with chlorine, or substances yielding chlorine, to separate the last portions of iron, substantially as set forth.

2. The process of treating oxidized ores of nickel, by first heating them with chloride of sodium or chloride of calcium, for the purpose of separating the iron contained in the ores, and then obtaining metallic nickel, or alloy of nickel, from the purified ores, substantially as described.

3. The process of treating oxidized ores of nickel by heating them with sulphur, or with sulphate of lime, or other sulphates, and carbon, or with sulphuret of nickel, of copper, or of lead, or with arsenical pyrites or other arsenical compounds.

4. The process of obtaining soluble chlorides of nickel by calcining sulphurets or arseniurets of nickel, and recalcining them with chloride of sodium, or other substance which will convert the nickel into a soluble chloride, which is recovered by treatment with water.

5. The process of converting the nickel contained in sulphur compounds of nickel into a soluble sulphate by calcining said compounds with bisulphate of potash, or other substance capable of yielding sulphuric acid, substantially as set forth.

JOSIAH MASON. [L. S.]
ALEXANDER PARKES. [L. S.]

Witnesses:
GEORGE SHAW,
RICHARD SKERRETT,
   37 *Temple Street, Birmingham.*